O. C. ROSS.
Devices for Preventing Horses from Crowding.
No. 141,386. Patented July 29, 1873.
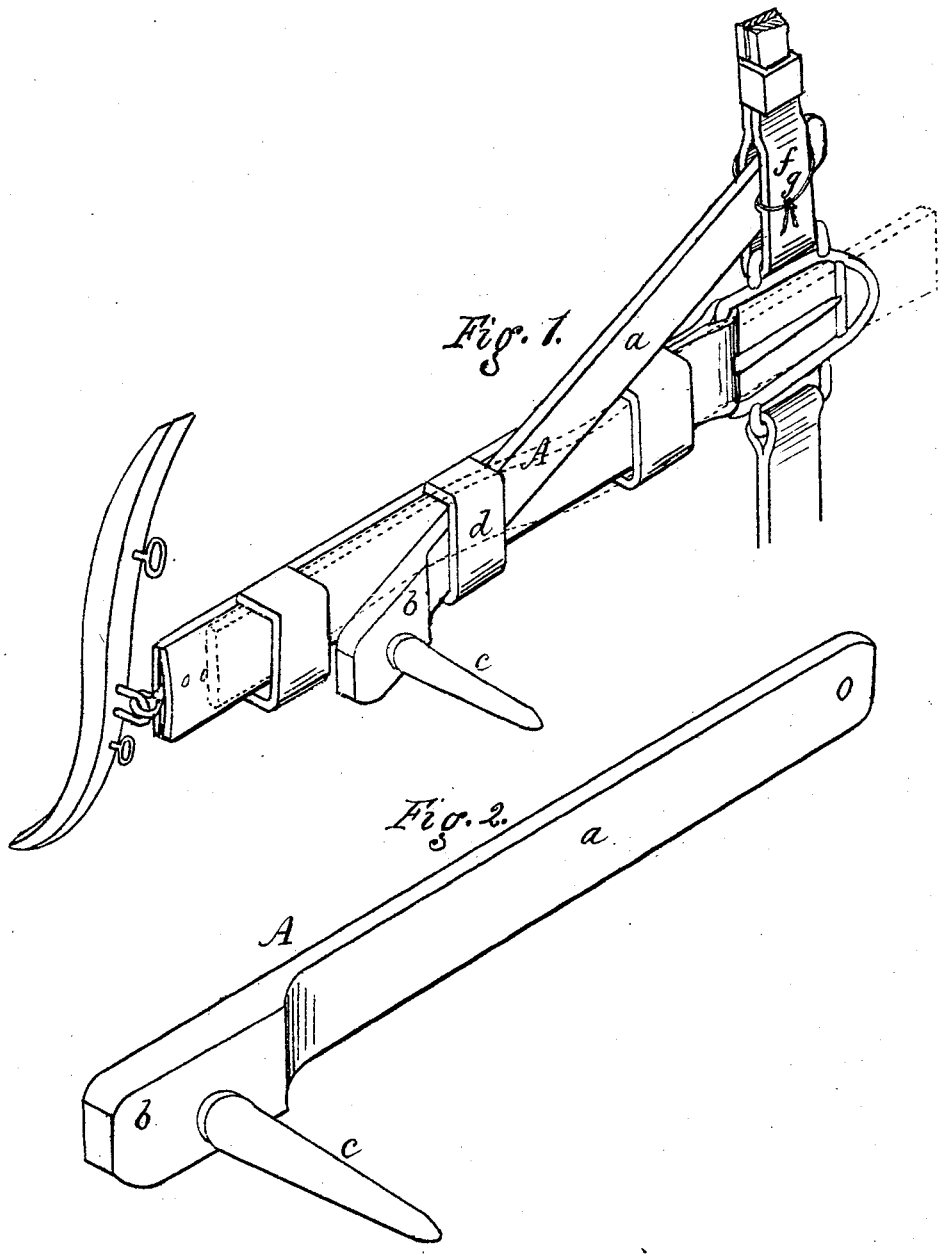

UNITED STATES PATENT OFFICE.

OLIVER C. ROSS, OF PENFIELD, NEW YORK.

IMPROVEMENT IN DEVICES FOR PREVENTING HORSES FROM CROWDING.

Specification forming part of Letters Patent No. 141,386, dated July 29, 1873; application filed May 31, 1873.

*To all whom it may concern:*

Be it known that I, OLIVER C. ROSS, of Penfield, in the county of Monroe and State of New York, have invented a certain new and useful Improvement in Devices for Preventing Horses from Crowding; and I do hereby declare that the following is a full, clear, and exact description of the construction and operation of the same.

My invention consists of a blade armed with a projecting pin, which blade is inserted endwise through one of the loops of the hame-tug, and through the loop of the back-strap, and is secured in place by a string or cord, the pin projecting between the horses in such a manner that any crowding by the near horse will bring his shoulder in contact with the pin, as hereinafter described.

In the drawings, Figure 1 is a perspective view of the device attached to the harness; Fig. 2, a similar view of the device separate.

A represents the device, which consists simply of the blade $a$ with a head, $b$, and a projecting pin, $c$, which is blunt-pointed, and stands toward the near horse so as to strike the lower or fleshy portion of the shoulder in case of crowding. The blade is simply inserted through one of the loops $d$ of the hame-tug, and then carried back through the loop $f$, formed by the attachment of the back strap to the hame-tug, to which it is fastened by a string or cord, $g$, or in any equivalent manner. The dotted lines represent the trace or tug.

This connection of the device carries the pin below the hame-tug, so that it comes opposite the exposed shoulder of the near horse, and, in crowding, will strike a part which is not covered by harness.

The device is preferably made of wood, as it is cheap and easily formed. It is especially adapted to use in plowing, where the natural tendency is for the near horse to crowd the off one, especially if the near horse is the freest one. This is more particularly the case where the near horse has before been used in the furrow, his natural desire being to get back there again.

The use of this device obviates all difficulty of the kind, as the horse, after coming in contact with the pin a few times, will avoid it, and learn to keep his place.

It is also of service in turning corners, as it keeps the horses apart, and prevents one stepping on the other, and causes the near horse to move without waiting for the action of the off one. It keeps the space between the horses open so that the operator can see through in advance of his work. It renders the horses more comfortable in warm weather by allowing proper ventilation between.

The device does not annoy the horse when he becomes accustomed to it, and does not injure him in the least. It obviates a difficulty experienced by every farmer, and enables him to do better work with much less labor and trouble.

The special novelty in the device consists in its form, by which it may be inserted in the loops of the harness, as described, and come opposite the exposed or uncovered part of the shoulder, and it touches the horse in the right place and at the right time.

What I claim is—

The device herein described, consisting of the blade $a$, head $b$, and pin $c$, arranged to be inserted in the loops of the harness, as herein shown and described.

In witness whereof I have hereunto signed my name in the presence of two subscribing witnesses.

O. C. ROSS.

Witnesses:
R. F. OSGOOD,
HENRY M. THOMAS.